July 5, 1927.  1,635,140

M. C. McM. O'BRIEN

MEANS FOR THE PROTECTION OF JEWELERS' WINDOWS AND THE LIKE

Filed Oct. 12, 1926    5 Sheets-Sheet 1

M. C. M. O'Brien
Inventor

By Marks & Clerk
Attys.

July 5, 1927.
M. C. McM. O'BRIEN
1,635,140
MEANS FOR THE PROTECTION OF JEWELERS' WINDOWS AND THE LIKE
Filed Oct. 12, 1926     5 Sheets-Sheet 2
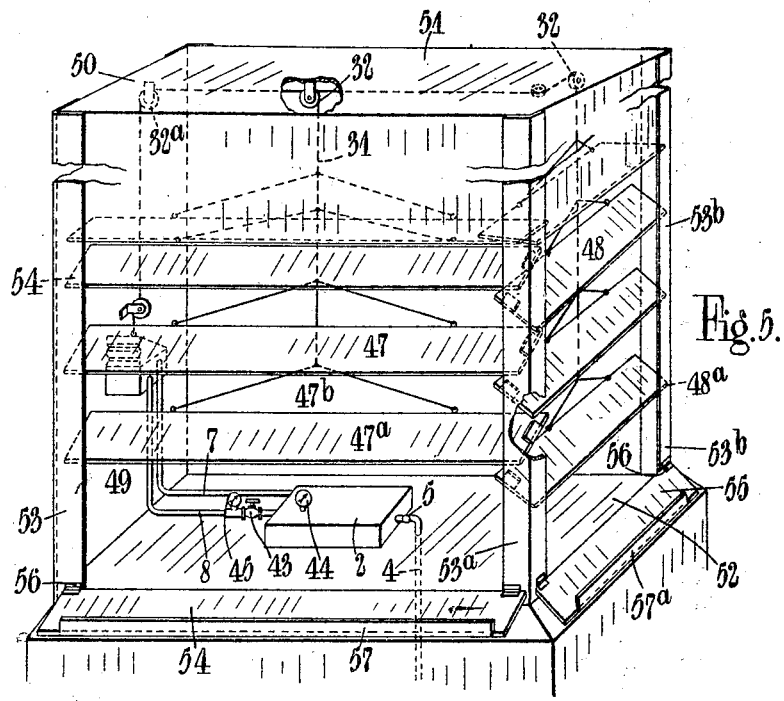
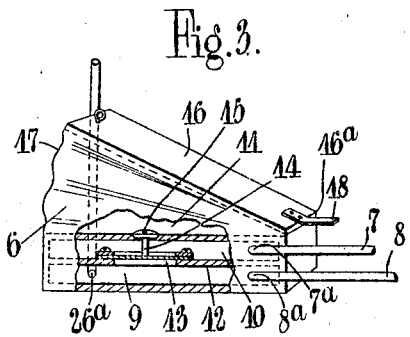
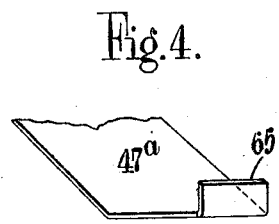

July 5, 1927.  
M. C. McM. O'BRIEN  
1,635,140  
MEANS FOR THE PROTECTION OF JEWELERS' WINDOWS AND THE LIKE  
Filed Oct. 12, 1926   5 Sheets-Sheet 3
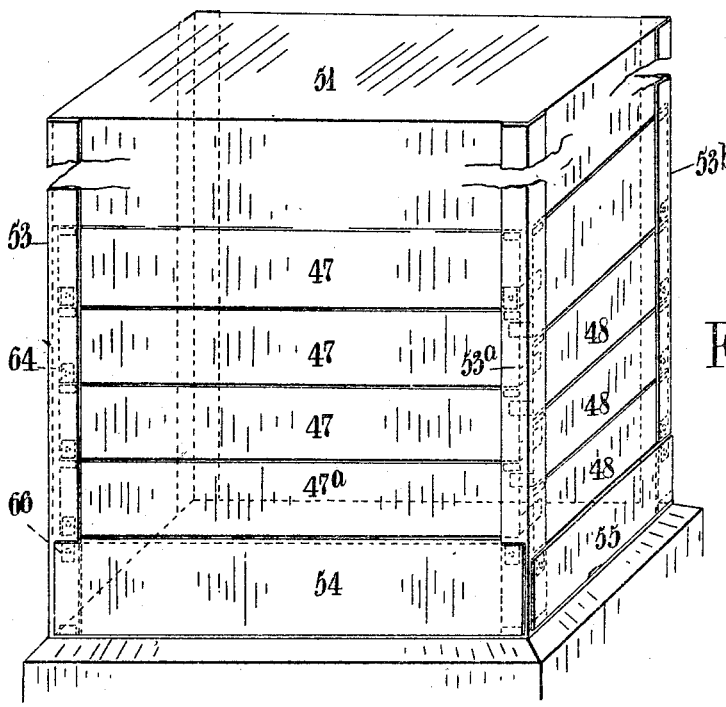
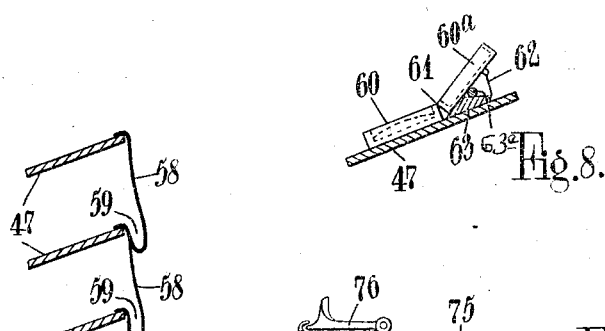
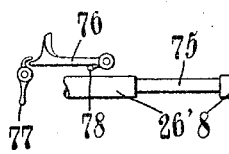

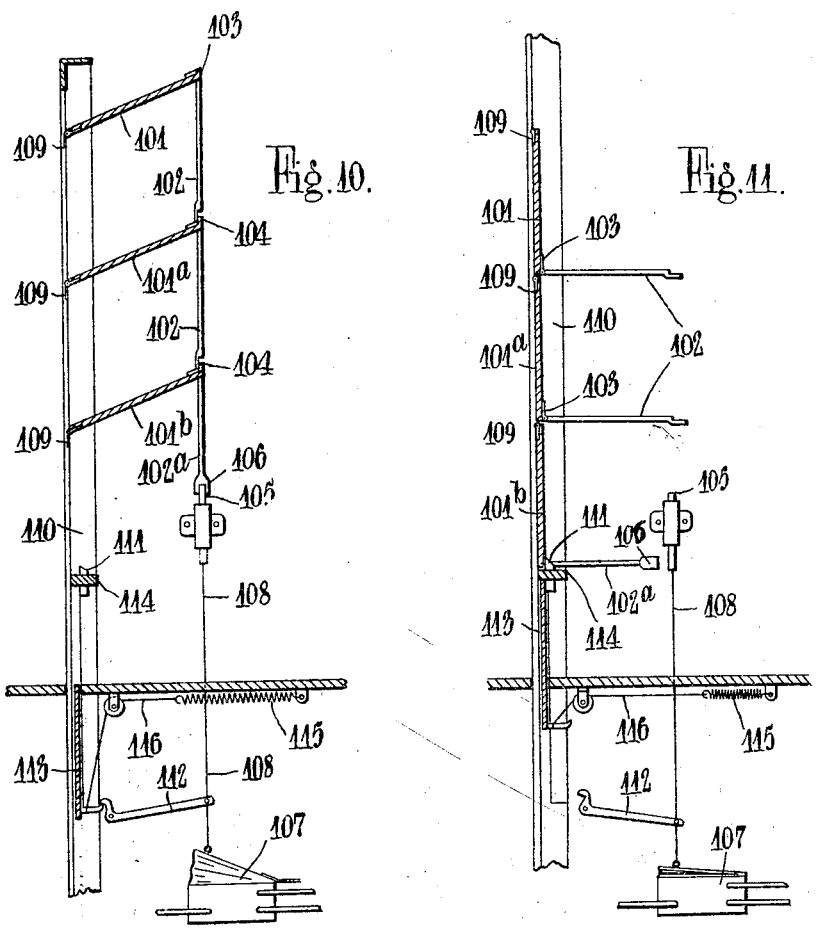

July 5, 1927.
M. C. McM. O'BRIEN
1,635,140
MEANS FOR THE PROTECTION OF JEWELERS' WINDOWS AND THE LIKE
Filed Oct. 12, 1926   5 Sheets-Sheet 5
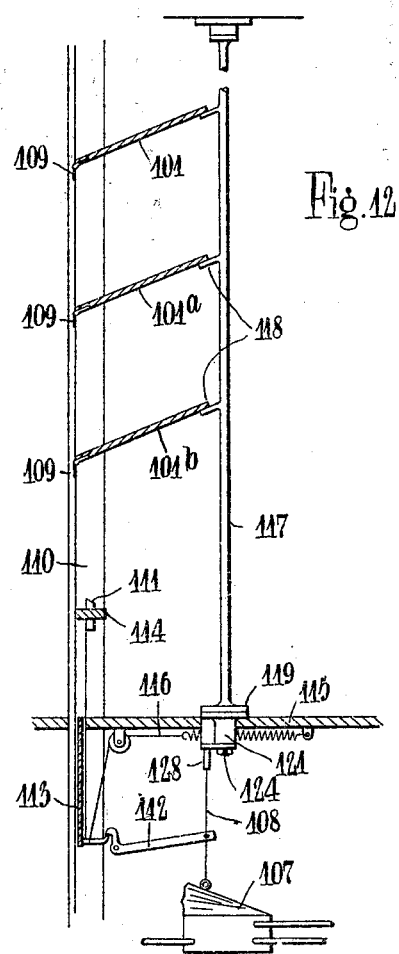
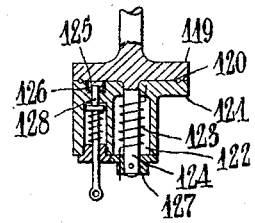
M. C. M. O'Brien
inventor
By: Marks & Clark
Attys.

Patented July 5, 1927.

1,635,140

UNITED STATES PATENT OFFICE.

MORGAN CYPRIAN McMAHON O'BRIEN, OF AUCKLAND, NEW ZEALAND.

MEANS FOR THE PROTECTION OF JEWELERS' WINDOWS AND THE LIKE.

Application filed October 12, 1926, Serial No. 141,216, and in Great Britain June 10, 1925.

This invention relates to means for the protection of jewelers' windows, and the like.

The invention may be used associated with a pressure-operated protection system for safes, strong rooms and the like, wherein a variation of pressure caused by tampering with the pressure system causes an alarm to be sounded; or may be used independently thereof.

The invention comprises a vacuum or air exhausted cavity applied in connection with hinged shelves or the like in a window show case, counter or other object and connected with an alarm system arranged to operate when the vacuum is destroyed or tampered with.

According to the invention two or more panes of window glass are used and these are placed together so as to leave a cavity or space therebetween and a pressure-tight joint made around their edges in any suitable way, such as by a strip of rubber placed between the glass. Suction is applied to the space between the glass through a tube and the connection of this tube to the glass may be through a hole bored in the inner glass to which a rubber sucker has been attached or by hypodermic needles or suitable nipples inserted through the jointing material at the edges or in any other suitable way. The suction tube leads from the window and is connected to one side of a pouch in a suitable valve-box, and out through the valve-box to a vacuum-container.

The valve-box is connected to the vacuum-container and to suitable bellows or plunger so that the vacuum of the container is applied to the bellows or plunger when the valve in the valve-box lifts. The valve is lifted by the pouch if air is admitted through the tube connected to the window which happens when the window is broken. This tube could be fitted with one or two valves, one of which would admit air to the tube if it were opened and the effect would be the same as if the window had been broken. One of these taps or valves would be so fitted that it would be turned on if a pressure-operated protective system such as above referred to relating to safes, doors or windows or skylights, were interfered with. The second tap or valve would be operated by a time device to prevent the window mechanism functioning when pressure or vacuum locked doors were opened by an authorized person at a fixed time or at the usual time. When the vacuum container is connected to the bellows or plunger by the lifting of the valve in the valve-box, movement will take place and this movement is utilized to make an electric contact and give an alarm, and also to trip suitable gear so that the contents of the window are (a) instantly tipped or lowered into the basement, or (b) the containers in which they are displayed are immediately snapped shut by springs and locked.

In (a) the contents fall into a suitable container which is tripped and locked, by the fall of the floor of the window.

The arrangement could also be a combination of (a) and (b). The floor of the window could drop on a hinge or drop bodily. Shelves could be supported from the roof of the window at one edge and from the floor at the other edge and the cross support could be hinged at each joint so that when the floor dropped the shelf would drop to the perpendicular. The containers for jewels could be boxes designed to be closed by a spring when tripped and could close on a hinge in the orthodox manner or the "lid" could be half a cylinder and be closed by the revolution of a shaft.

The bottom of the window and shelves above it could be constructed in a pivotal manner so that when the tripping gear functioned the floor and shelves would drop or tilt and the contents would disappear from sight. There are other ways of fitting up such bottom and shelves so as to obtain a falling or tilting action to protect the goods.

With regard to the combination with my present invention of a pressure-operated protective system in conjunction with the use of microphones, I claim to make it certain that any attempt to force an entry to a jeweler's shop, or such like place, even if made through walls, roof or floor, of same will not only give an alarm while the burglar is still outside the building, but will also immediately place all valuables in show cases either in the shop or in the window of same or in any way contained in the shop in an open way, in closed containers which will be locked, or in other ways made difficult of access to the burglar.

To this end any alteration of pressure balances or the functioning of the microphone-operated mechanism may be made to open a valve in the vacuum pipe, which on the admission of atmosphere causes the tripping mechanism to function, or the vacuum pipe may partly consist of a frail glass tube which would be broken by either of the foregoing happenings by suitable means.

My window arrangement is applicable to the type of show cases usually standing against a wall behind a counter. The counter of a jeweler's shop is also frequently a show case and this could be so constructed that one of its sides could be the lid or door of a container or safe situated below the trays of jewels and held open against a spring by the sides of the said trays. When the protection mechanism functioned the jewels would drop to the bottom of the container or safe and the lid or door would be thereby released to be snapped shut by a suitable spring and could be locked by a spring catch.

When window or show case shelves or floors fall to the vertical position a bolt could fall by gravity from one shelf into a socket suitably placed in the shelf beneath, so that a screen consisting of several shelves so locked together could be formed. All shelves or floors could be made of steel or any suitable material and the jewel cases could be constructed of similar material which could be camouflaged in any suitable manner so as to have a non-conventional appearance. The cases could be firmly attached to the shelves or floor of window or such like, and the lids could be held open against the tension of a spring which would be suitably adjusted to tripping mechanism so as to be "tripped" when the shelves moved from the plane in which they normally rested.

In protecting the door of a jeweler's shop from any type of attack calculated to cut round locks, bolts, or bars, the inside of the door could be fitted with a pressure pipe in such a manner that it would of necessity be cut by any such attack and said pipe could be connected to the pressure system by a suitable pressure bolt. Explosive substance may be used to ensure that sufficient vibration is occasioned by any type of attack to ensure the functioning of the microphone system and constructional methods generally will have this object in view.

The accompanying drawings illustrate the invention:

Figure 3 is a detail in perspective and section of make-and-break device.

Figure 4 is a detail view of end of window shelf showing upstanding part.

Figure 5 is a front perspective view of shelves and attachments in view position, not showing shop front.

Figure 6 is a front perspective view showing shelves in locked position.

Figure 7 is a sectional detail view of shelves provided with flexible end covers.

Figure 8 is a detail view of self-closing jewel cases or boxes carried on shelves.

Figure 9 is a detail view of trip device for fracturing glass pressure tube.

Figure 10 is a sectional view of shelve fixtures showing trip gear and shelves in set position.

Figure 11 is a sectional view of shelve fixtures showing trip gear and shelves in tripped position.

Figure 12 is a sectional view of shelve fixtures showing alternative method of shelve supports and trip gear in set position.

Figure 13 is a detail of shelve support trip gear.

Figure 1:
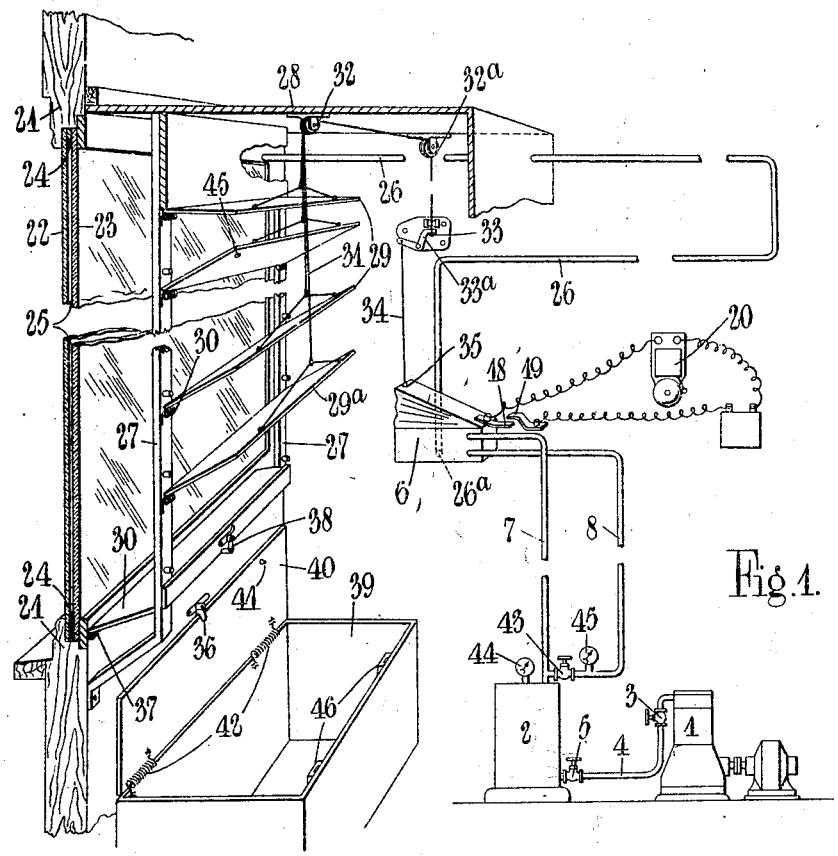
Figure 1 is a general view partly in perspective and partly in section showing the invention as applied to jeweler's window.

Referring to the drawings, Figures 1 to 6, the device illustrated is vacuum operated.

Vacuum is caused by vacuum pump 1, Figure 1, or by any suitable source, in a container 2 through valve 3, pipe 4 and check valve 5. The vacuum container is then connected to a make-and-break device 6 by pipes 7 and 8. This make-and-break device 6 (see Figure 3) has three chambers 9, 10 and 11. Between chambers 9 and 10 and partitions 12 and 14 is fitted an airtight pouch 13. Between chambers 10 and 11 is fitted a valve 15, the stem of which is secured to pouch 13. The top plate 16 of chamber 11 is hinged at one end 16$^a$ to partition 14 and is fitted round the other three sides with a suitable airtight fabric 17 and made collapsible similar to a bellows.

On the hinged end 16$^a$ of top plate 16 a contact 18 is fitted so as to make-and-break with contact 19 when top plate 16 collapses and returns. Contacts 18 and 19 are connected to an electric bell alarm 20 or any other suitable alarm system. Pipe 7 is secured to centre chamber 10 at 7$^a$ and pipe 8 to bottom chamber 9 at 8$^a$.

The shop front 21, Figure 1, is fitted with two panes of glass 22 and 23 with a thin strip of suitable jointing material 24 between the panes 22 and 23 and all round the outer edges, thus sealing the small space 25 between the said panes. At the top corner, or at any suitable place in the inner pane 23, a small hole is drilled and penetrates into the space 25 into which is secured pipe 26 which connects space 25 to bottom chamber 9 of make-and-break device 6 at point 26$^a$.

The window fittings consist of two or more standards 27, preferably of steel, suitably spaced and secured, one end to the ceiling 28 and the other end under the window or to the floor as desired. The shelves 29 are spaced horizontally and edge on to uprights 27 and secured thereto by strong suitable spring hinges 30 and are held up at a suitable angle against the springs in hinges 30 by rings and cords 31 fitted on the opposite edge. These cords 31 are carried up to the ceiling 28, pass over pulleys 32 and 32ª and down to trip gear 33 where the cord 31 is fitted with a suitable eye to take end of trip lever 33ª. The other end of trip lever 33ª is secured by a cord 34 to eye 35 secured in top plate 16 of make-and-break device 6. The bottom shelf or floor 36, Figure 1, is held suspended against shop front 21 by strong spring hinges 37 and held at a suitable angle against springs in hinges 37 by trip catch 38. Immediately under these window fittings a suitably sized box 39, preferably of steel, is placed with the lid 40 held open by trip catch 41 against spring hinges 42.

The whole of these fittings are partitioned from the shop in a suitably strong enclosure fitted with suitable doors to give access to the window for dressing or withdrawal of goods. These doors can also be attached to the device so as to trip the shelves and give an alarm if opened at any unauthorized time.

To set the device the valves 3 and 43 are opened and the vacuum pump 1 set in motion. All the air is first withdrawn and then a vacuum created in the space 25 between window frames 22 and 23, pipe 26, make-and-break device 6, pipes 7 and 8 and container 2. When the required vacuum is obtained which will be registered on gauges 44 and 45, the valves 3 and 43 are closed and all the fittings are set as shown in Figure 1.

If either or both of the window panes 22 and 23 are broken the vacuum in space 25, pipe 26, chamber 9 and pipe 8 as far as valve 43 (which is closed) is immediately destroyed by the inrush of air. As soon as the air rushes into chamber 9 of device 6, atmospheric pressure obtains on the underside of pouch 13, thereby causing it to open valve 15 and the consequent creation of the vacuum in chamber 11 causes top plate 16 to collapse by atmospheric pressure, thereby tripping lever 33ª by means of cord 34, thus releasing cord 31 which allows the spring hinges 30 to instantly collapse shelves 29 into the vertical position, simultaneously shooting all the display goods off the shelves into the box 39 which is obviously lined with cotton wool or the like to protect the goods from damage. As soon as the shelves 29 hit against the uprights 27 they are locked in position by suitable spring locks 45 and catches 46 provided in shelves 29 and uprights 27 thus forming a locked steel screen inside the broken window. As the shelf 29ª reaches the vertical position it trips the catch 38 which releases the bottom shelf or floor 36 which is forced into the vertical position by spring hinges 37. It in turn, on reaching the vertical position, trips the catch 41, thereby releasing lid 40 which is forced closed by spring hinges 42 and instantly locked by suitable spring locks 46 after receiving all the goods off the shelves.

Figures 5 and 6 show a method whereby the window fixtures can be transformed into a steel case on the breaking of the window panes or interference with any of the device attachments.

Figure 5 shows a show case that can be arranged in the shop front or inside the shop. It is shown with show shelves 47 and 48 on two sides which will be fronted with the double panes of glass as in Figure 1 and hereinbefore described and the other two sides 49 and 50, top 51 and floor 52 of steel plates one side fitted with suitable door for access to the goods and mechanism, etc.

The uprights 53 are of steel angle section and secured to top 51 and floor 52. The shelves 47 and 48 are secured horizontally and edge on to the inside of the angle uprights 53 by strong suitable spring hinges 54 and are held up at a suitable angle against the springs in hinges 54, by rings and cords 31 fitted on the opposite edge. The cords 31 are carried up to the ceiling 51 or top, passed over pulleys 32 and 32ª and down to trip gear 33 and connected to the trip devices as hereinbefore described. The bottom shelves 54 and 55 are secured to the outside face of the uprights 53 by strong suitable spring hinges 56 horizontally on one longitudinal edge and held down against the springs in spring hinges 56 by trip catch, not shown. The opposite longitudinal edge 57 of shelves 54 and 55 is turned up at right angles.

Down the back of the shelves 47 and 48 is hung any suitable strong soft material 58 secured to each longitudinal edge 47ª 48ª of shelves 47 and 48 and left with a sag or pocket 59, see Figure 7, or as an alternative method, see Figure 8, the jewel cases 60 can be fitted with spring lids and the cases securely fastened to the shelves 47 and 48, the lids being held open against the spring hinge 61 by a small trip lever 62 which is lightly hooked to eye in shelf 47. As soon as the shelf 47 starts to move the roller 63ª, which is placed between the lid 60ª and the hook 62, rolls down race piece 63, releases lever 62 and the lid 60ª instantly closes and locks up the jewels.

When the cord 31 has been released from the trip gear 33 by it being caused to function, the shelves 47 and 48 instantly collapse into the vertical position against the uprights 53. The ends at upright 53 and 53ᵇ are instantly locked with spring locks 64 fixed in uprights, see Figure 6, and the ends at upright 53ª automatically lock each other by flat ends 65, Figure 4, overlapping.

As soon as the shelves 47ᵇ and 48ᵇ strike the uprights they trip the tripping gear holding down shelves 54 and 55 and they instantly close up against the uprights with the aid of spring hinges 56 and are automatically locked by spring locking 66, see Figure 6. Shelves 54 and 55 may be fitted on the inside of uprights if desired. The upturned edge 57, 57ª of shelves 54 and 55 are to assist in carrying the jewels against fabric 58 which is draped down on the inside. In a show case of this type the vacuum tank 2 with all its connections can be housed in the show case, see Figure 5, and the pipe 4 from the vacuum unit, which is fixed in any convenient place, is shown coming through the floor 52.

Figure 2:
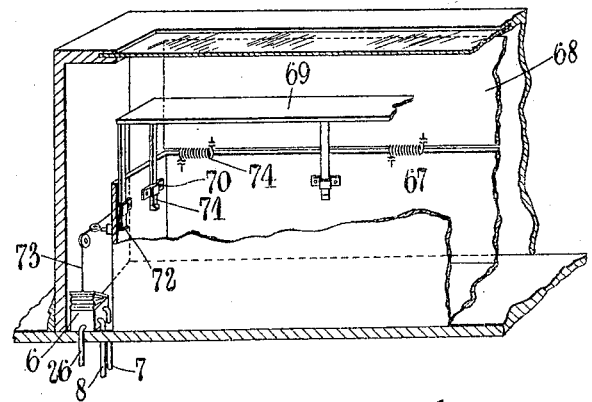
Figure 2 is a perspective and sectional view of show case to which the invention is applied.

This device can also be applied to a show counter, see Figure 2. The bottom portion is a steel box 67, the lid 68 is held up by show shelf 69 which is fitted with uprights 70 held in position by brackets 71 and supported by spring catches 72. When the make-and-break device 6 is caused to function as previously described, the catches 72 are withdrawn from under uprights 70 by means of cord 73 and instantly the shelf 69 drops inside the box 67 and the lid 68 assisted by spring hinges 74 closes and is locked over it and its contents by spring locks provided.

It is obvious that the tripping gear herein described functions when vacuum is broken in any of the connections between valve 43 and window panes 22 and 23 and this vacuum circuit may be fitted with any number of sets of tripping gear or vacuum breaking devices which may be suitably fitted and adjusted in relation to the pressure circuit of the protective pressure system previously referred to, so that the vacuum is destroyed if the pressure balances of the protective pressure system are disturbed. One way of so inter-relating the devices is described, see Figure 9. Pipe 26 or 8 is fitted with a short glass tube 75, and a trip-hammer 76 is so placed in relation to the glass tube 75 that when catch-lever 77 which is holding hammer 76 back against spring 78 is tripped, the hammer 76 instantly flies over and breaks the glass tube 75, thereby destroying the vacuum and causing make-and-break device 6 to function as hereinbefore described.

The lever 77 may be tripped by any suitable known means.

On the elevated edge of shelves 101, 101ª and 101ᵇ, see Figure 10, two or more spring hinged supports 102 are secured which are brought to the vertical against spring in the hinge 103 and are held in position against pin 104 in lower shelf 101ª and 101ᵇ. Support 102ª is held in position by spring bolt 105 fitting in socket 106.

The spring bolt 105 is attached to make-and-break device 107 by cord 108. When the make-and-break device 107 is caused to operate, the spring bolt 105 is withdrawn from socket 106 by cord 108, the main support being removed from under shelf 101ᵇ, the spring hinges 104 instantly throws supports 102 and 102ª away from shelves 101, 101ª and 101ᵇ and simultaneously the said shelves assisted by spring hinges 109 are brought to the vertical against supports 110. Shelf 101ᵇ is automatically locked by spring catch 111. The other shelves 101 and 101ª can be locked as previously described, lever 112 being attached to cord 108 is simultaneously tripped thereby releasing shutter 113 which is instantly shot up against horizontal bar 114 by means of tension spring 115 and cord 116 where it is automatically locked by spring lock, thereby securely closing off the bottom portion of the show case.

The alternative method of shelf support, Figures 12 and 13, consists of two or more vertical standards 117 fitted with supporting pieces 118 for shelves 101, 101ª and 101ᵇ. The foot is fitted with a collar 119, Figure 13, which rotates on steel balls 120 on housing 121 and is fitted with axle pin 122 which passes through housing 121 and is fitted with spring 123, one end of which is secured to housing 121 and the other end to collar 124. A pin 125 is secured in collar 119 and works in a sector race 126 in housing 121.

When the spring 123 is in position a twisting tension is put on it by turning nut 124 which is then secured to spindle 122 by split pin 127. The standard 117 is turned in the housing 121 against the spring tension until pin 125 is between the end of the race 126 and the spring bolt 128 which is fitted in the housing 121 and projects into race 126. The standard 117 is thus held when the shelves 101, 101ª and 101ᵇ are in position, see Figure 12. The top end of standard 117 can be fitted with a similar housing but without the spring bolt 128 if desired.

When the make-and-break device 117 is caused to operate the spring bolt 128 is withdrawn from against pin 125, the standard 117 is instantly turned to the extent of the travel allowed for pin 125 in race 126, by the tension on the spring 123 which is sufficient to carry supports 118 clear of shelves 101, 101ª and 101ᵇ, thus allowing said shelves to collapse as previously described.

Having now described my invention, what I claim as new and desire to secure by Letters Patent is:—

1. In combination, a window, an element disposed in said window having a vacuum chamber therein, a trip gear associated with and adapted to be released upon fracture of said element, and window contents protecting means controlled by said trip gear.

2. In combination, a window, an element disposed in said window having a vacuum chamber therein, a trip gear associated with and adapted to be released upon fracture of said element, and window contents protecting means controlled by said trip gear, said window contents protecting means including hinged shelves releasably held in normal position.

3. In combination, a window, an element disposed in said window having a vacuum chamber therein, a trip gear associated with and adapted to be released upon fracture of said element, and a plurality of hinged shelves normally held in operative position and adapted to be released upon the release of the trip gear.

4. In a protective system, a window, an element disposed in said window having a vacuum cavity therein, means for producing vacuum in said cavity, a protecting device, a bellows device for actuating the protecting device, a valve box and a valve in said box, the lifting of the valve acting to connect the bellows with the vacuum producing means for actuating the protecting device.

5. In combination, a window, an element disposed in said window having a vacuum cavity therein, releasable shelves, a trip gear normally holding the shelves in operative position adapted to be released upon fracture of said element, a container adapted to receive articles resting on said shelves upon the release of the latter, and means for closing and locking the said container.

6. In combination, a window, an element disposed in said window having a vacuum cavity therein, releasable shelves, a trip gear normally holding the shelves in operative position adapted to be released upon fracture of said element, a container adapted to receive articles resting on said shelves upon the release of the latter, and means for closing and locking the said container, said container including a spring actuated lid and means released by one of said shelves normally retaining said lid in open position.

In testimony whereof I have signed my name to this specification.

MORGAN CYPRIAN McMAHON O'BRIEN.